(12) United States Patent
Nicklay et al.

(10) Patent No.: US 10,940,414 B2
(45) Date of Patent: Mar. 9, 2021

(54) RECIRCULATION FILTER FOR AN ELECTRONICS ENCLOSURE

(71) Applicant: Donaldson Company, Inc., Minneapolis, MN (US)

(72) Inventors: Allen N. Nicklay, Eden Prairie, MN (US); Scott A. Keller, Savage, MN (US); Stanley B. Miller, III, Eden Prairie, MN (US); Katsushi Isogawa, Eagan, MN (US); John Frein, Bloomington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 264 days.

(21) Appl. No.: 15/564,997

(22) PCT Filed: Apr. 6, 2016

(86) PCT No.: PCT/US2016/026205
§ 371 (c)(1),
(2) Date: Oct. 6, 2017

(87) PCT Pub. No.: WO2016/164454
PCT Pub. Date: Oct. 13, 2016

(65) Prior Publication Data
US 2018/0085693 A1     Mar. 29, 2018

Related U.S. Application Data

(60) Provisional application No. 62/144,157, filed on Apr. 7, 2015.

(51) Int. Cl.
*B01D 39/16* (2006.01)
*B01D 53/82* (2006.01)
(Continued)

(52) U.S. Cl.
CPC ..... *B01D 39/1607* (2013.01); *B01D 39/1623* (2013.01); *B01D 46/521* (2013.01);
(Continued)

(58) Field of Classification Search
CPC .... B01D 39/1607; B01D 53/04; B01D 53/82; B01D 39/1623; B01D 46/521;
(Continued)

(56) References Cited

U.S. PATENT DOCUMENTS 5,205,938 A    4/1993  Fiumano et al.
5,417,743 A    5/1995  Dauber
(Continued)

FOREIGN PATENT DOCUMENTS

JP    S63-086815 U     6/1988
JP     6168585 A  *   6/1994
(Continued)

OTHER PUBLICATIONS

"Disk Drive Filters Adsorbent Assembly Product Brochure," W. L. Gore & Associates, Inc., 2006 (2 pages).
(Continued)

*Primary Examiner* — Waqaas Ali
(74) *Attorney, Agent, or Firm* — Mueting Raasch Group

(57) ABSTRACT

A filter assembly for use in an electronics enclosure is disclosed herein. The filter assembly has an inner assembly having a filter material comprising fibrous media and a containment assembly having a first containment layer and a second containment layer. The containment assembly defines an outer perimeter and the first containment layer and a second containment layer are bonded along the outer perimeter in an outer weld area to encapsulate the inner assembly. The outer weld area extends between the outer perimeter and an interior perimeter. The inner assembly defines an inner assembly perimeter that is within the outer perimeter of the containment assembly.

17 Claims, 7 Drawing Sheets

(51) Int. Cl.
*B01D 53/04* (2006.01)
*B01D 53/26* (2006.01)
*B01D 46/52* (2006.01)

(52) U.S. Cl.
CPC ......... *B01D 53/04* (2013.01); *B01D 53/0415* (2013.01); *B01D 53/261* (2013.01); *B01D 53/82* (2013.01); *B01D 2239/0407* (2013.01); *B01D 2251/304* (2013.01); *B01D 2251/306* (2013.01); *B01D 2251/404* (2013.01); *B01D 2251/606* (2013.01); *B01D 2251/608* (2013.01); *B01D 2253/102* (2013.01); *B01D 2253/104* (2013.01); *B01D 2253/106* (2013.01); *B01D 2253/108* (2013.01); *B01D 2257/708* (2013.01); *B01D 2279/45* (2013.01)

(58) Field of Classification Search
CPC .............. B01D 53/261; B01D 53/0415; B01D 2251/608; B01D 2253/106; B01D 2253/108; B01D 2253/102; B01D 2239/0407; B01D 2257/708; B01D 2253/104; B01D 2251/606; B01D 2251/404; B01D 2251/306; B01D 2251/304; B01D 2279/45
See application file for complete search history.

(56) References Cited

U.S. PATENT DOCUMENTS

| | | | |
|---|---|---|---|
| 5,980,616 A * | 11/1999 | Johnson | B01D 39/086 210/491 |
| 5,997,618 A * | 12/1999 | Schneider | B01D 39/16 96/135 |
| 6,161,540 A | 12/2000 | Fecteau | |
| 8,257,591 B2 | 9/2012 | Goldman | |
| 8,263,214 B2 | 9/2012 | Kalayci et al. | |
| 8,545,607 B2 | 10/2013 | Cambo et al. | |
| 8,753,438 B2 | 6/2014 | Dallas et al. | |
| 2007/0283809 A1 | 12/2007 | Boulay et al. | |
| 2008/0226534 A1 | 9/2008 | Gidumal et al. | |
| 2009/0015964 A1 * | 1/2009 | Hong | G11B 33/1446 360/97.16 |
| 2009/0247970 A1 | 10/2009 | Keleny et al. | |
| 2013/0088795 A1 | 4/2013 | Brown | |
| 2018/0085698 A1 * | 3/2018 | Motomura | B01D 46/0036 |

FOREIGN PATENT DOCUMENTS

| | | |
|---|---|---|
| JP | 2000-342680 A | 12/2000 |
| JP | 2009-022892 A | 2/2009 |
| JP | 2009-540481 A | 11/2009 |
| JP | 2013-084340 A | 5/2013 |
| WO | 2008112250 | 9/2008 |
| WO | 2015123406 | 8/2015 |
| WO | 2016164454 | 10/2016 |

OTHER PUBLICATIONS

"Disk Drive Filters Electrostatis Recirculation Filter Product Brochure," W. L. Gore & Associates, Inc., 2006 (2 pages).
"International Preliminary Report on Patentability," for PCT Application No. PCT/US2016/026205 dated Oct. 19, 2017 (6 pages).
"International Search Report & Written Opinion," for PCT/US2016/026205 dated Jul. 1, 2016 (8 pages).

* cited by examiner

RECIRCULATION FILTER FOR AN ELECTRONICS ENCLOSURE

PRIORITY

This application is being filed as a PCT International Patent application on Apr. 6, 2016 in the name of DONALDSON COMPANY, INC., a U.S. national corporation, applicant for the designation of all countries and Allen N. Nicklay, a U.S. Citizen, Scott A. Keller, a U.S. Citizen and Stanley B. Miller, III, a U.S. Citizen, inventors for the designation of all countries; and Katsushi Isogawa, a Japanese Citizen and John Frein, a U.S. Citizen, applicants and inventors for all designated states, and claims priority to U.S. Provisional Patent Application No. 62/144,157, filed on Apr. 7, 2015, the contents of which are herein incorporated by reference in their entirety.

FIELD OF THE TECHNOLOGY

The present application relates to a filter and method. More specifically, the present application relates to a recirculation filter for an electronics enclosure.

BACKGROUND

Some filters for electronics enclosures incorporate filter materials that can shed particulate material into the enclosure environment, which can cause damage to the electrical components. The filters typically incorporate multiple layers of filter material that are welded together adjacent their outer perimeters. Attempts have been made to rectify the shedding issue by adding outer layers that are configured to contain the shed particulates within the filter assembly. In such attempts, the outer layers are layered against the outside surfaces of the filter material. The outer layers are generally coextensive with the outside surfaces of the filter material. The outer layers and the layers of filter material are then welded together in a weld area that is at, or adjacent to, the outer perimeter of the filter. However, it has been discovered that shedding of filter material can still occur along the edges of the recirculation filter. Shedding can occur during manufacturing of the electronics enclosure, when the recirculation filter is being installed or inserted into the recirculation filter holder contained in the electronics enclosure. The welded edges of the recirculation filter can rub against the recirculation filter holder during installation. This rubbing can abrade off particles from the welded edges of the recirculation filter, which can result in unwanted loose particles being present in the electronics enclosure.

BRIEF DESCRIPTION OF THE DRAWINGS

The presently-described technology may be more completely understood and appreciated in consideration of the following detailed description of various embodiments in connection with the accompanying drawings.

FIG. 1b is a detail view of FIG. 1a.

DETAILED DESCRIPTION

Figure 1A:
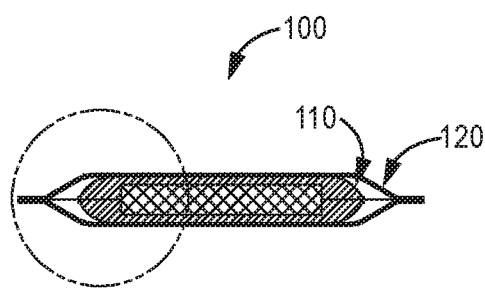
FIG. 1a is a cross-sectional view of an example recirculation filter consistent with the technology disclosed herein.
Figure 1B:
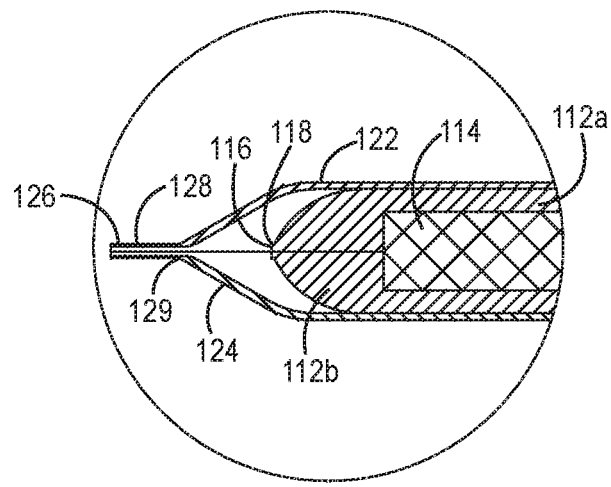
Figure 2:
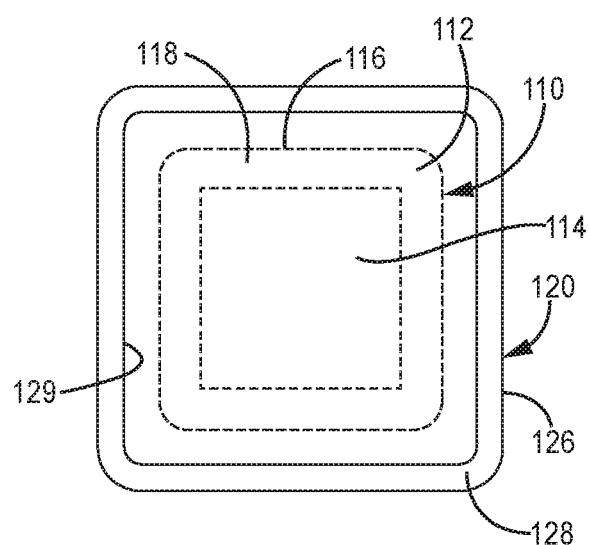
FIG. 2 is a facing view of the example recirculation filter of FIGS. 1a and 1b.

In various embodiments, the current technology relates to a recirculation filter that contains particulates shed from the filter materials, so that such particulates are not released into the filter's environment. FIGS. 1a-1b are cross-sectional views of an example filter element 100 consistent with the technology disclosed herein, and FIG. 2 is a facing view of the example recirculation filter. The recirculation filter 100 has an inner assembly 110 and a containment assembly 120 that encapsulates the inner assembly 110. The containment assembly 120 is generally configured to contain particulates resulting from shedding of the inner assembly 110 so that such particulates are not released from the filter element 100.

Generally, the inner assembly 110 has a perimeter 116, hereinafter referred to as the "inner assembly perimeter," that falls within the outer perimeter 126 of the containment assembly 120. In multiple embodiments the inner assembly 110 defines an inner weld area 118 and the containment assembly 120 defines an outer weld area 128, where the outer weld area 128 is outside of the inner weld area 118. The inner 118 and outer 128 weld areas are generally configured to bond various layers together to contain filter components therein. The inner 118 and outer 128 weld areas can be heat welds, ultrasonic welds, or other types of welds.

The inner assembly 110 can have a variety of configurations. In the current embodiment, the inner assembly 110 has filter material 112 and an adsorbent 114, where the filter material 112 is positioned adjacent to the adsorbent. In particular, the filter material 112 encapsulates the adsorbent 114, which is in the form of a layer, and each of the inner assembly perimeter 116 and the inner weld area 118 extends around the perimeter of the adsorbent 114. The filter material 112 has a first layer 112a and a second layer 112b that are bonded together along the inner assembly perimeter 116 to encapsulate the adsorbent 114. In this particular embodiment, the first layer 112a and second layer 112b are welded together about the perimeter of the adsorbent 114 in the inner weld area 118. The first layer 112a and the second layer 112b can be substantially coextensive in some embodiments, where "substantially coextensive" is generally intended to mean that the layers have outer perimeters that are substantially the same shape and size, and that the outer perimeters are substantially aligned with each other. In one embodiment, the filter material is folded to define the first layer 112a and the second layer 112b. In such an embodiment, the inner weld area and the fold line would, in combination, extend around the entire perimeter of the adsorbent to encapsulate the adsorbent. In a variety of embodiments, the inner weld area 118 is substantially free of adsorbent 114. In some embodiments, which will be described below, an adsorbent can be omitted.

The first layer 112a and the second layer 112b can be constructed of different materials, but in a variety of embodiments the first layer 112a and the second layer 112b are the same filter material. As will be described below, in some embodiments the second layer 112b of filter material 112 can be omitted. The filter material 112 can be a variety of types of materials and combinations of materials. In one embodiment, the filter material 112 has multiple layers of materials, such as a filtration layer combined with another type of filtration layer and/or a support layer. The support layer can be a permeable scrim material having woven or non-woven fibers, such as polypropylene fibers. In various embodiments, the filter material 112 has fibrous media. In some embodiments, the filter material 112 can incorporate adsorbent fibers. In a variety of embodiments, the filter material 112 has electrostatic fibers. The term "electrostatic fibers," as used herein, refers to fibers that are electrostatically charged.

One advantage of including electrostatic fibers in the filter material 112 is that the filter is not only able to mechanically trap contaminants, but is also able to exert an electrostatic force on contaminants that contain electric charges, thereby increasing the amount of contaminants that are removed from the airstream. The electrostatic media can be triboelectric media, electret media, or any other media that is or can be charged, or that employs electrostatic filtration as a substantial mechanism for particle removal. In example embodiments, the electrostatic media has triboelectric fibers. Triboelectric fibers can be formed, for example, using a mixture of (1) polyolefin fibers such as polyethylene, polypropylene or ethylene and propylene copolymers, with (2) fibers of another polymer, for example, fibers containing hydrocarbon functions substituted by halogen atoms, such as chlorine or polyacrylonitrile fibers. In general, the polyolefin fibers and the other polymer fibers are included in the electrostatic media at a weight ratio between about 60:40 or about 20:80 or about 30:70. Other types of fibers and combinations of fibers can also be used to form the electrostatic media.

The filter material 112 has, for example, a permeability of between about 250 ft./min. at 0.5 inches of water and about 750 ft./min. at 0.5 inches of water. The filter material 112 can have a filtering efficiency of about 20% to about 99.99% for 0.1 to 0.3 micron particulate contaminants in some embodiments. Filter material 112 can, for example, have a filtering efficiency of greater than 2% for 0.1 to 0.3 micron particulate contaminants; greater than 40% for 0.1 to 0.3 micron particulate contaminants; or greater than 60% for 0.1 to 0.3 micron particulate contaminants. The filter material 112 can have in some example implementations a filtering efficiency of less than 99.99% for 0.1 to 0.3 micron particulate contaminants; less than 80% for 0.1 to 0.3 micron particulate contaminants; or less than 60% for 0.1 to 0.3 micron particulate contaminants. Efficiency is calculated herein based on a face velocity of 10.5 ft/min.

The adsorbent 114 is generally configured to adsorb chemical contaminants from the environment within an electronics enclosure. The adsorbent 114 can be a physisorbent or chemisorbent material, such as, for example, a desiccant (i.e., a material that adsorbs water or water vapor) or a material that adsorbs volatile organic compounds, acid gas, or both. Suitable adsorbents include, for example, activated carbon, activated alumina, molecular sieves, silica gels, potassium permanganate, calcium carbonate, potassium carbonate, sodium carbonate, calcium sulfate, or mixtures thereof. The adsorbent 114 can have a variety of structures, not limited to beads, particles, tablets, and the like. The adsorbent 114 can have substantially unbonded constituents or the constituents can be bonded with a binder to itself or another material such as a support scrim. In embodiments where an adsorbent is bonded to a support scrim, the support scrim can be substantially coextensive with the filter material, or the support scrim can be encapsulated by the filter material. In some embodiments, filters consistent with the technology disclosed herein do not have an adsorbent layer disposed within the inner assembly, as will be demonstrated below.

The containment assembly 120 encapsulates the inner assembly 110 of the filter element 100. Generally the inner assembly perimeter 116 falls within the outer perimeter 126 of the containment assembly 120. In a number of embodiments, including the one currently depicted, the inner assembly perimeter 116 falls within the outer weld area 128 defined by the containment assembly 120.

The containment assembly 120 has a first containment layer 122 and a second containment layer 124. The first 122 and second 124 containment layers can be different materials, but in a variety of embodiments the first 122 and second 124 containment layers are the same material. The first containment layer 122 and the second containment layer 124 can be substantially coextensive, in some embodiments. The first containment layer 122 and the second containment layer 124 are generally bonded along the outer perimeter 126 of the containment assembly 120 to encapsulate the inner assembly 110 to define the outer weld area 128 which has an interior perimeter 129. The thickness of the outer weld area 128 between the outer perimeter 126 and the interior perimeter 129 can be configured to balance interests in (1) achieving sufficient bonding strength between the first containment layer 122 and the second containment layer 124, (2) providing sufficient surface area to properly mount the filter element (see discussion of FIG. 3, below), and (3) providing sufficient clearance between the inner assembly 110 and containment assembly to maximize manufacturing tolerances. Generally the thickness of the outer weld area 128 will be consistent around the outer perimeter 126 of the containment assembly 120.

In one embodiment, the first containment layer 122 and the second containment layer 124 are formed by folding the containment material over the inner assembly 110. In such an embodiment, the outer weld area 128 and the fold line would, in combination, extend around the entire perimeter of the inner assembly 110 to encapsulate the inner assembly 110.

The containment assembly 120 is generally constructed of a material or combinations of materials that will contain particulate material shed from the inner assembly 110. Furthermore, the containment assembly 120 is generally configured to be substantially non-shedding. In various embodiments, the first containment layer 122 and the second containment layer 124 are constructed of fibers such that the first containment layer 122 is a first fiber layer and the second containment layer 124 is a second fiber layer. The fibers in the fiber layers can be natural or synthetic fibers. In some embodiments the first containment layer 122 and the second containment layer 124 are constructed of a woven or non-woven scrim material such as polyester, polypropylene or polyethylene. In some embodiments the first containment layer 122 and the second containment layer 124 are each a woven polyester scrim having a yarn diameter of 50-90 microns and a yarn count of 110/inch-170/inch. In some embodiments the first containment layer 122 and the second containment layer 124 are each a woven polyester scrim having a yarn diameter of 60-80 microns and a yarn count of 120/inch-160/inch. In some embodiments the first containment layer 122 and the second containment layer 124 are each a non-woven polyester scrim having a permeability of 500-1000 ft/min at 0.5 inches of water and a basis weight of about 10-20 g/m².

The containment assembly 120 can be constructed of a material that has, for example, a permeability of between about 100 ft./min. at 0.5 inches of water and about 800 ft./min. at 0.5 inches of water in some embodiments. The permeability is the linear air flow velocity through a medium at 0.5 inches of water (125 Pa) when tested using a Textest FX3310 air permeability tester made by Textest AG in Schwerzenbach, Switzerland, according to ASTM D737-04. In some embodiments the containment assembly 120 material has a permeability of between about 250 ft./min. at 0.5 inches of water and about 600 ft./min. at 0.5 inches of water. In yet other implementations the containment assembly 120 material has a permeability of between about 300 ft./min. at 0.5 inches of water and about 500 ft./min at 0.5 inches of water. It will be understood that the containment assembly 120 material can have, for example, a permeability of more than 100 ft./min. at 0.5 inches of water; more than 250 ft./min. at 0.5 inches of water; or more than 300 ft./min. at 0.5 inches of water. The containment assembly 120 material can have, for example, a permeability of less than about 800 ft./min. at 0.5 inches of water in some embodiments; less than 600 ft./min. at 0.5 inches of water in some embodiments; or less than 500 ft./min. at 0.5 inches of water in some embodiments. The containment assembly 120 material can have an efficiency of at least 30%, 40%, 50% or 60% for 0.1 micron spherical particulate contaminants. The containment assembly 120 material can have a pressure drop of less than 0.10 inches $H_2O$ at 10.5 ft/min.

The filter element 100 is generally configured to have an efficiency of at least 50%, or in some embodiments at least 60% or even 65%, for 0.1 micron spherical particulate contaminants and a pressure drop of less than 0.10 inches $H_2O$ at 10.5 ft/min.

Figure 6A:
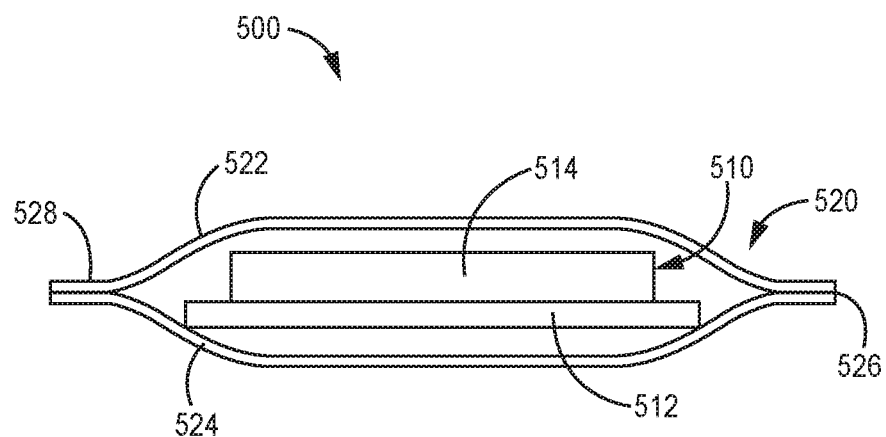
FIG. 6A depicts a cross-sectional view of another example embodiment consistent with the technology disclosed herein.
Figure 6B:
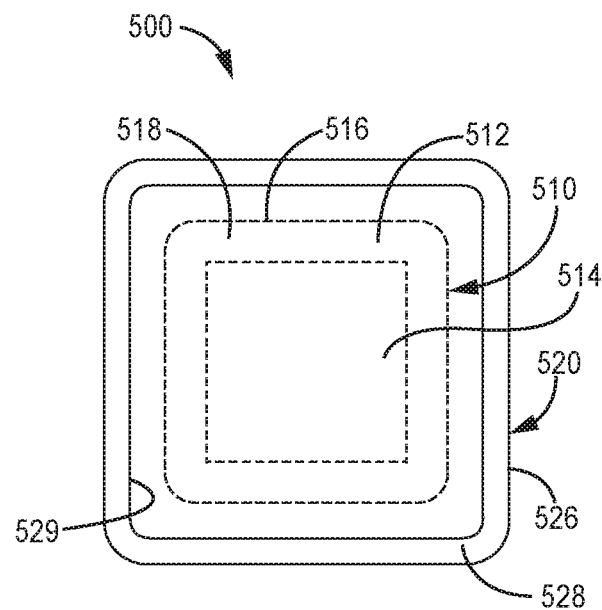
FIG. 6B depicts a facing view of the example embodiment of FIG. 6A.

FIGS. 6A and 6B depict an alternate embodiment of a filter assembly 500 consistent with the technology disclosed herein. An inner assembly 510 is encapsulated by a containment assembly 520. The containment assembly 520 defines an outer perimeter 526. The containment assembly has a first containment layer 522 and a second containment layer 524 that are bonded along the outer perimeter in an outer weld area 528 to encapsulate the inner assembly 510. The outer weld area 528 extends between the outer perimeter 526 and an interior perimeter 529. The inner assembly 510 has an inner assembly perimeter 516 that is within the outer perimeter 526 of the containment assembly 520. Similar to the embodiments described above, the inner assembly 510 of the filter assembly 500 has filter material 512 having fibrous media and an adsorbent 514 adjacent to the filter material 512. In a variety of embodiments, the adsorbent 514 is coupled to the filter material 512.

Generally the materials used for components in this alternative embodiment will be consistent with those materials already described above. Contrary to the embodiments described above, embodiments consistent with the current figures have an inner assembly 510 where the filter material 512 does not encapsulate the adsorbent 514 layer.

Figure 7A:
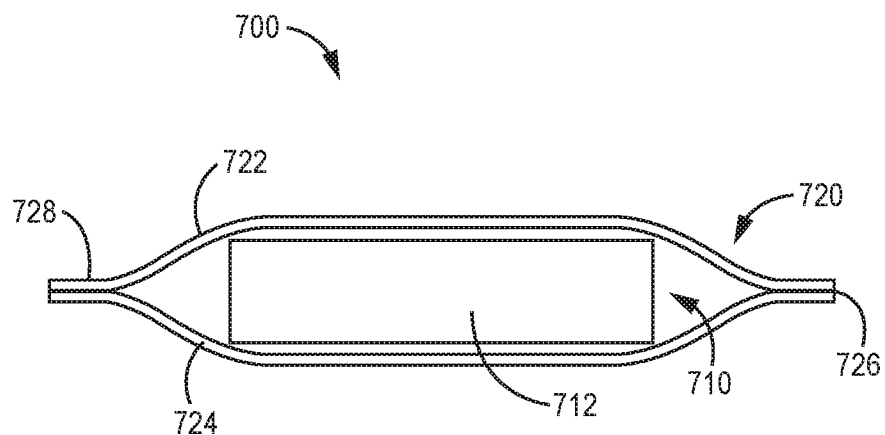
FIG. 7A depicts yet another example embodiment consistent with the technology disclosed herein.
Figure 7B:
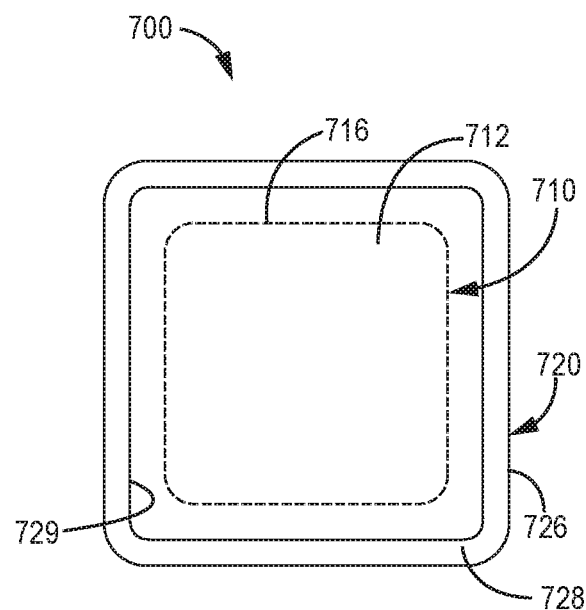
FIG. 7B depicts a facing view of the example embodiment of FIG. 7A.

FIGS. 7A and 7B depict an alternate embodiment of a filter assembly 700 consistent with the technology disclosed herein. An inner assembly 710 is encapsulated by a containment assembly 720. The containment assembly 720 defines an outer perimeter 726. The containment assembly has a first containment layer 722 and a second containment layer 724 that are bonded along the outer perimeter 726 in an outer weld area 728 to encapsulate the inner assembly 710. The outer weld area 728 extends between the outer perimeter 726 and an interior perimeter 729. The inner assembly 710 has an inner assembly perimeter 716 that is within the outer perimeter 726 of the containment assembly 720. Similar to the embodiments described above, the inner assembly 710 of the filter assembly 700 has filter material 712 that has fibrous media.

Generally the materials used for components in this alternative embodiment will be consistent with those materials already described above. Contrary to the embodiments described above, embodiments consistent with the current figures have an inner assembly 710 where the filter material 712 is not adjacent to an adsorbent layer. In such embodiments, the inner assembly 710 can lack adsorbent material or, in some other embodiments, the inner assembly 710 can have adsorbent material disposed throughout the filter material 712.

In various embodiments it can be desirable to limit shifting of the inner assembly 110, 510, 710 relative to the containment assembly 120, 520, 720. FIGS. 5A through 5E each depict example filter assembly configurations 600 generally consistent with embodiments consistent with FIGS. 1A-2 and 6A-7B, which are described in detail above (including potential modifications). In each figure the recirculation filter 600 has an inner assembly 610 and a containment assembly 620 that encapsulates the inner assembly 610. The inner assembly 610 generally has a first layer of filter material 612 having fibrous media. The inner assembly 610 can also have an adsorbent 614 that is adjacent to the filter material 612 although, as described above, the adsorbent can be omitted in some embodiments and in some other embodiments an adsorbent 614 is present. The inner assembly 610 can also have a second layer of filter material bonded with the first layer of filter material in an inner weld area 618, although a second layer of filter material is not required in all embodiments and, likewise, an inner weld area 618 is not required in all embodiments. The containment assembly 620 has layers of fiber material that are bonded along an outer perimeter 626 in a weld area 628 having an interior perimeter 629. The inner assembly 610 has an inner assembly perimeter 616 that falls within the outer perimeter 626 of the containment assembly 620.

While the bonded outer perimeter 626 of the containment assembly 620 limits shifting of the inner assembly 610 (and, more particularly, fibers from the inner assembly 610) beyond the outer perimeter 626 of the containment assembly 620, the locking structure generally limits shifting of the inner assembly 610 relative to the containment assembly 620 within the outer perimeter 626 of the containment assembly 620. The example locking structures depicted in FIGS. 5A-5E are not exhaustive and can be combined and altered, as will be appreciated by those having skill in the art. The locking structure is generally at least one bonding element within the interior perimeter 629 of the outer weld area 628 that restricts movement of the inner assembly 610. The bonding element can be, for example, an adhesive or a weld area in addition to the inner weld area 618 (if present) and the outer weld area 628. The term "adhesive" as used herein refers to any material that can be used to form a bond between respective components. Non-limiting examples of adhesives include hot-melt adhesives, pressure-sensitive adhesives, glues, epoxies, and the like.

Figure 5A:
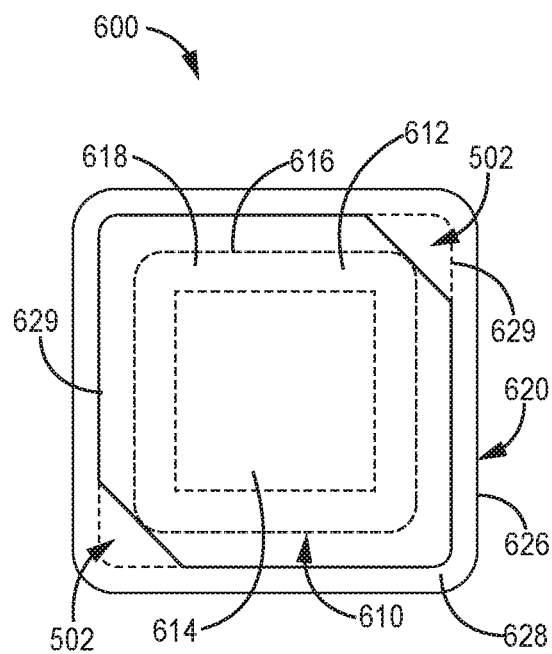
FIGS. 5A-5E each depict facing views of additional example recirculation filters consistent with the technology disclosed herein.

Turning now specifically to FIG. 5A, the filter assembly 600 defines a locking structure 502 that is configured to limit shifting of the inner assembly 610 relative to the containment assembly 620 within the interior perimeter 629 of the outer weld area 628. The locking structure 502 is generally one or more bonding elements, such as an adhesive or melted region of the containment assembly, disposed within the interior perimeter of the outer weld area 628. The melted region of the containment assembly 620 can be where the containment assembly 620 was welded through heat welding or ultrasonic welding, as examples. The locking structure 502 of FIG. 5A can be considered an extension of the outer weld area 628, both of which bond the first containment layer of the containment assembly 620 to the second containment layer of the containment assembly 620. In the current embodiment, the locking structure 502 abuts portions of the outer weld area 628 such that portions of the interior perimeter 629 are not visible.

Figure 5B:
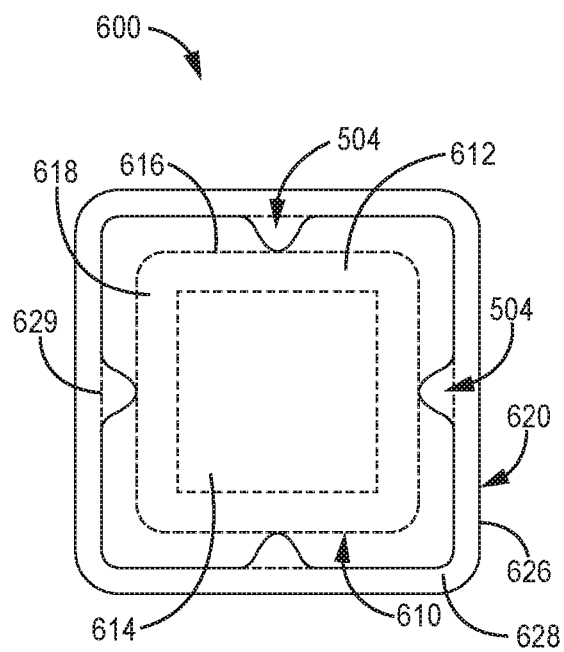

FIG. 5B depicts a filter assembly 600 with a locking structure 504 similar to that described above, in that the locking structure 504 extends from the weld area 628 towards the inner assembly 610. In particular, the locking structure 504 is a plurality of bonding elements disposed within the interior perimeter 629 of the outer weld area 628. The bonding elements bond the first containment layer of the containment assembly 620 to the second containment layer (see FIG. 1B) of the containment assembly 620 to limit shifting of the inner assembly 610 relative to the containment assembly 620 within the interior perimeter 629. The locking structure 504 abuts portions of the outer weld area 628 such that portions of the interior perimeter 629 are not visible.

Figure 5C:
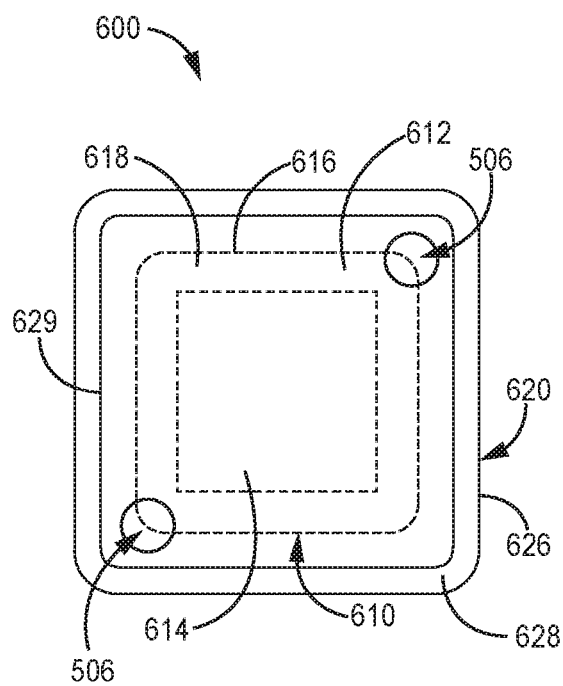

FIG. 5C depicts a filter assembly 600 with an alternate locking structure 506. In this embodiment the locking structure 506 couples the containment assembly 620 to the inner assembly 610. In some embodiments, the locking structure 506 couples at least an inner surface of the containment assembly 620 to an outer surface of the inner assembly 610. The locking structure 506 can be a bonding element such as adhesive and/or a melted portion of the containment assembly 620 achieved through welding, for example. In addition to coupling the containment assembly 620 to the inner assembly 610, the locking structure 506 can also couple the first containment layer of the containment assembly 620 to the second containment layer of the containment assembly 620.

Figure 5D:
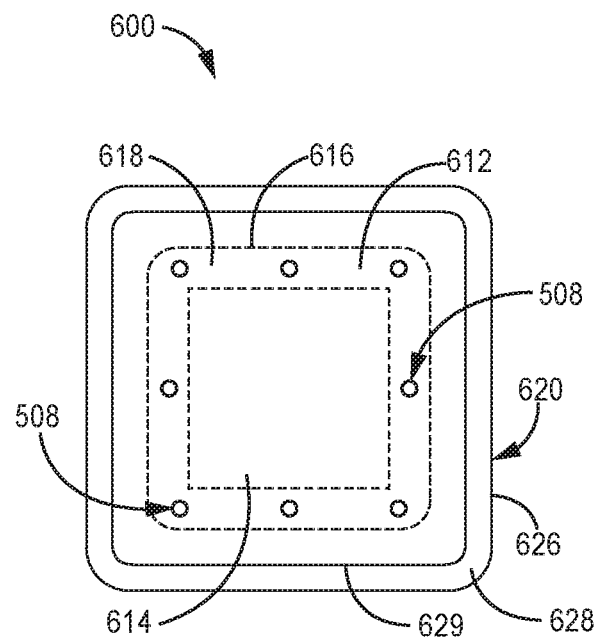
Figure 5E:
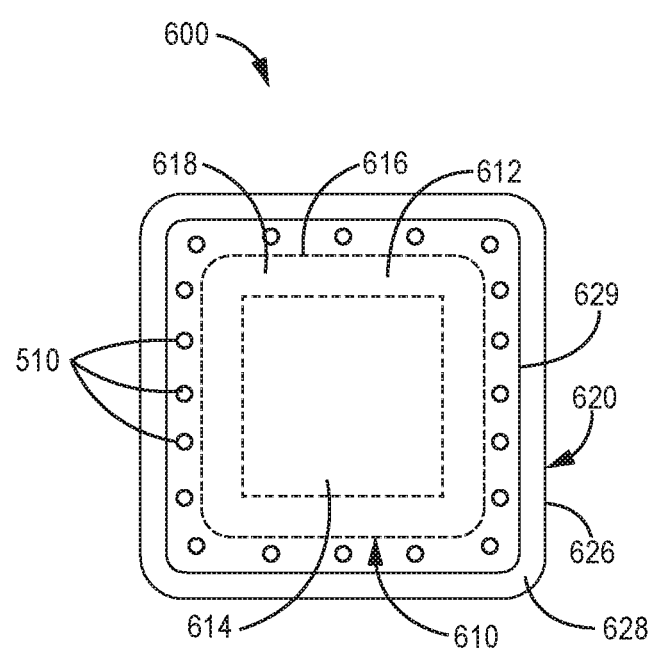

FIG. 5D depicts a filter assembly 600 with another alternate locking structure 508. The locking structure 508 is a plurality of bonding elements coupling the containment assembly 620 to the inner assembly 610. FIG. 5E depicts a filter assembly 600 with yet another example locking structure 510. The locking structure 510 is a plurality of bonding elements coupling the containment assembly 620 layers within the interior perimeter 629 to limit shifting of the inner assembly 610 within the interior perimeter 629.

In some embodiments it can be desirable to limit shifting of the inner assembly relative to the containment assembly (such as those disclosed in FIGS. 1A, 6A and 7A) by sizing the inner assembly and the containment assembly to mutually define an interference fit. Referring to FIGS. 1A-2 for illustration, in some embodiments the inner assembly 110, the containment assembly 120, and the outer weld area 128 can be sized for the filter element 100 such that the containment assembly 120 is under tension resulting from the inner assembly 110 and the inner assembly 110 is under slight compression from the containment assembly 120. Such forces can limit the ability of the inner assembly 110 to shift relative to the containment assembly 120.

Figure 3:
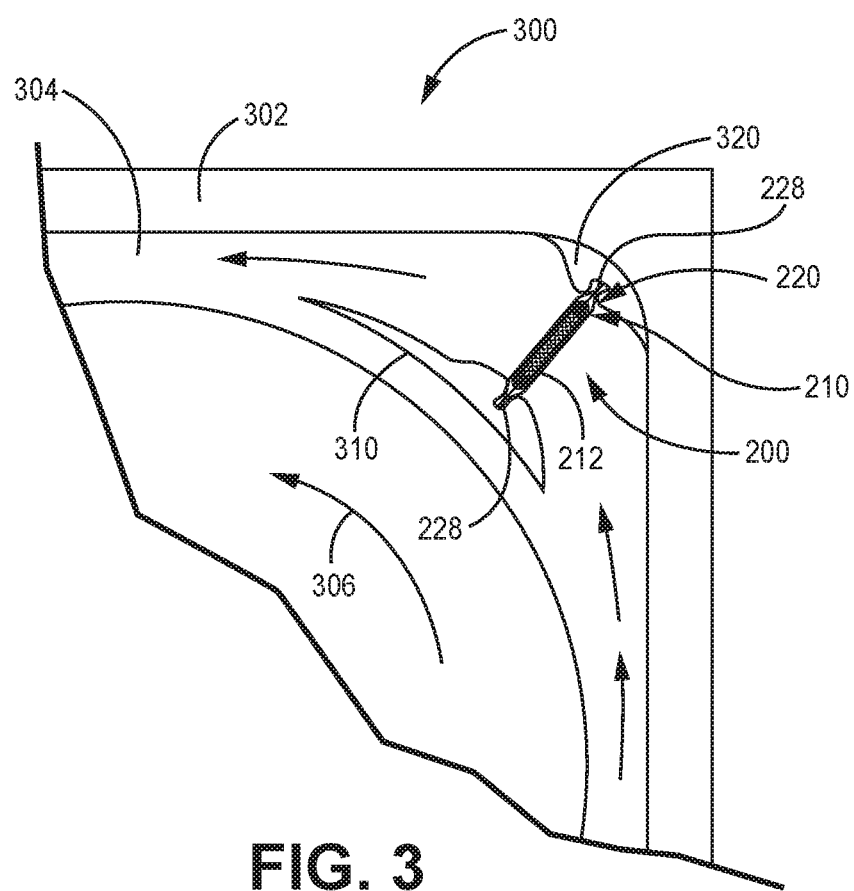
FIG. 3 is a schematic of a partial top plan view of an electronics enclosure containing a filter element constructed and arranged in accordance with an example embodiment.

FIG. 3 is a simplified representation of an example implementation of the technology depicted in FIGS. 1A-2. 5A-7B. A filter element 200 is installed in an electronics enclosure that is a disk drive 300. The disk drive 300 has a housing body 302 that defines an enclosure 304. In an example embodiment, at least one disk 306 is rotatably mounted within the enclosure 304. The rotation of the disk 306 is shown by arrows (although opposite rotation is alternatively possible), where the rotation of the disk 306 induces airflow within the enclosure 304. Other disk drive components, such as a read-write head and wiring can be incorporated into the disk drive 300.

The filter element 200 has an inner assembly 210 having filter material 212 and a containment assembly 220 that encapsulates the inner assembly 210. The filter element 200 is oriented so that the surface area of the filter material 212 is facing into the air stream generated by a rotating disk 306 (depicted directionally by arrows). The electronic enclosure 300 has a filter mount 320 that is configured to receive the filter element 200. In a variety of embodiments, the filter mount 320 is configured to receive an outer weld area 228 defined by the containment assembly 220, where the outer weld area 228 is described in detail above.

In the embodiment shown, a baffle 310 directs air into the filter material 212 of the filter element 200, and the baffle 310 at least partially defines the filter mount 320. The filter element 200 can be placed within the electronic enclosure such that the baffle 310 directs air into and through the filter material 212. In certain implementations the baffle 310, along with any mounting elements, or other portions of the housing, form a channel that directs air into the filter material 212. In other implementations the filter element 200 is configured to be positioned in a flowing air stream within an electronics enclosure that lacks a single defined channel directing airflow through the filter element 200, or an open-sided channel can be formed within the enclosure that partially directs air through the filter element 200.

Figure 4:
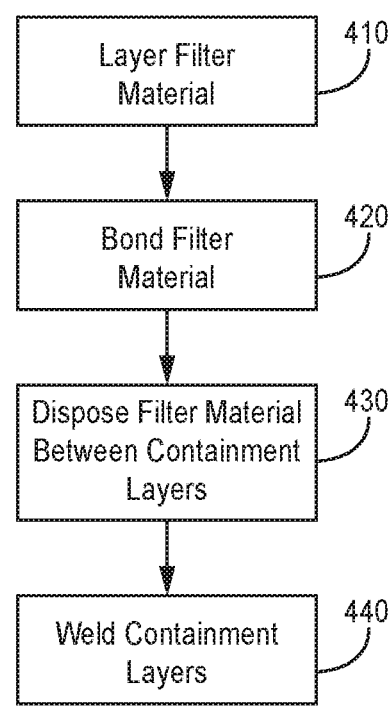
FIG. 4 is a flow chart depicting a method, according to an embodiment.

FIG. 4 is an example flow chart of a method 400 for filter elements consistent with the technology disclosed herein. Filter material is generally layered 410 and bonded 420, and the bonded filter material is disposed between containment layers 430. The containment layers are welded around the filter material 440. The materials and structures of the layers and other components described in association with the current figure are generally consistent with the information already described hereinabove.

The filter material can be layered 410 to dispose an adsorbent adjacent to the filter material. The filter material can be layered 410 to sandwich an adsorbent, in a variety of embodiments. In another embodiment, the filter material is layered 410 without an adsorbent disposed there-between. The filter material can be layered 410 to be substantially coextensive. In one embodiment, the filter material is layered by folding the filter material. In some embodiments, the filter material is layered 410 with additional layers of materials such as scrim layers or other types of layers of filter material.

The filter material is bonded 420, such as by welding together to form an inner assembly (110 of FIGS. 1-2, for example). The filter material layer can be bonded to an adsorbent, in some embodiments. Generally, where there are multiple filter material layers, the filter material layers are bonded 420 around the adsorbent to encapsulate the adsorbent. In a variety of embodiments the filter material layers are bonded 420 along, or adjacent to, their perimeters. In some embodiments the filter material layers are bonded 420 together about their entire perimeters. In some embodiments, the filter material layers are bonded 420 together to encapsulate an adsorbent element. In some embodiments, the filter material is a single layer and does not need to be bonded.

Layering the filter material 410 and bonding the filter material 420 are generally steps associated with forming the inner assembly. With embodiments consistent with FIGS. 7A and 7B, such steps may be omitted since the inner assembly lacks an adsorbent layer and a second layer of filter material. Similarly, with embodiments consistent with FIGS. 6A and 6B, the step of bonding the filter material 420 can be omitted where there is not another component in the inner assembly.

The filter material is disposed between containment layers 430, such that the containment layers 430 sandwiches the filter material. The containment layers can be a first containment layer and a second containment layer, although the containment layers can have other layers, as well. Generally the containment layers will be substantially coextensive. Generally, the entire outer perimeter of the filter material will be positioned within the outer perimeter of the containment layers 430. In some embodiments, it can be desirable to dispose adhesive between the containment layers and/or between a containment layer and the filter material to define a locking structure within the interior perimeter 430 to limit shifting of the inner assembly relative to the containment assembly. In such embodiments the adhesive can be disposed on the containment layer(s) and/or the filter material before or after the filter material is disposed between the containment layers 430. The amount of adhesive applied will generally be limited such that the adhesive does not dramatically block airflow through the resulting filter assembly.

The containment layers are welded around the filter material 440 to encapsulate the filter material to form a filter element. In a variety of embodiments, the containment layers are welded 440 along their outer perimeters to form a weld area. In a variety of embodiments, the containment layers are welded 440 outside of the outer perimeter edges of the filter material.

In some embodiments, it can be desirable to weld elements of the filter assembly together to define a locking structure that limits shifting of the inner assembly relative to the containment assembly within the interior perimeter. For example, the containment layers can be welded together within the interior perimeter of the outer weld area of the containment assembly (see FIG. 5A, for example). As another example, a containment layer can be welded with the filter material to bond the containment assembly to the inner assembly. Where the locking structure is defined by a weld, the welding can be accomplished simultaneously with the welding of the containment layers around the filter material 440 or at a different point in time.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as "arranged", "arranged and configured", "constructed and arranged", "constructed", "manufactured and arranged", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

What is claimed is:

1. A filter assembly for use in an electronics enclosure comprising:
    an inner assembly comprising a filter material comprising electrostatic fibers, wherein the inner assembly defines an inner assembly perimeter;
    a containment assembly defining an outer perimeter, the containment assembly is a first containment layer and a second containment layer bonded along the outer perimeter in an outer weld area to encapsulate the inner assembly, wherein the first containment layer and the second containment layer each have an air permeability from 500 ft./min. at 0.5 inches of water to 1000 ft./min. at 0.5 inches of water, wherein each of the first containment layer and the second containment layer extend from the inner assembly to the environment outside of the filter assembly, and wherein each of the first containment layer and the second containment layer are constructed of woven fibers,
    wherein the inner assembly perimeter is within the outer perimeter of the containment assembly, and
    wherein the outer weld area extends between the outer perimeter of the containment assembly and an interior perimeter of the outer weld area; and
    a locking structure that is configured to limit shifting of the inner assembly relative to the containment assembly within the interior perimeter of the outer weld area, wherein the locking structure comprises a plurality of bonding elements extending into the interior perimeter.

2. The filter assembly of claim 1, wherein the inner assembly further comprises an adsorbent adjacent to the filter material.

3. The filter assembly of claim 2, wherein the filter material encapsulates the adsorbent.

4. The filter assembly of claim 1, wherein the bonding elements are in the group consisting of: an adhesive and a melted region of the containment assembly, wherein the bonding elements are disposed within the interior perimeter of the outer weld area.

5. The filter assembly of claim 1, wherein the locking structure bonds the containment assembly to the inner assembly.

6. The filter assembly of claim 1, wherein the locking structure comprises the first containment layer bonded to the second containment layer within the interior perimeter of the outer weld area.

7. The filter assembly of claim 1, wherein the filter material comprises a first layer of filter material and a second layer of filter material bonded to the first layer of filter material in an inner weld area.

8. The filter assembly of claim 2, wherein the filter material comprises a layer of filter material coupled to the adsorbent.

9. The filter assembly of claim 1, wherein the inner assembly and the containment assembly mutually define an interference fit.

10. A method of making a filter assembly comprising:
    disposing an inner assembly between a first containment layer and a second containment layer, the inner assembly comprising filter material having electrostatic fibers, wherein the inner assembly defines an inner assembly perimeter;
    bonding the first containment layer and the second containment layer around the inner assembly in an outer weld area to encapsulate the inner assembly and to define a containment assembly having an outer perimeter and an interior perimeter, wherein each of the containment layers:
- are constructed of woven fibers,
- have an air permeability from 500 ft./min. at 0.5 inches of water to 1000 ft./min. at 0.5 inches of water, and
- extend from the inner assembly to the environment outside of the filter assembly;

wherein the inner assembly perimeter is within the outer perimeter of the containment assembly, and wherein the outer weld area extends between the outer perimeter of the containment assembly and an interior perimeter of the outer weld area; and bonding the first containment layer and the second containment layer to define a locking structure comprising a plurality of bonding elements extending into the interior perimeter, wherein the locking structure is configured to limit shifting of the inner assembly relative to the containment layers.

11. The method of claim 10, further comprising bonding a containment layer with a filter material layer to define the locking structure.

12. The method of claim 10, wherein the containment layers comprise scrim.

13. The method of claim 10, further comprising forming an inner assembly comprising disposing an adsorbent adjacent to the filter material and fixing the filter material relative to the adsorbent.

14. The method of claim 13, wherein disposing the adsorbent adjacent to a filter material comprises disposing the adsorbent between layers of the filter material.

15. The method of claim 13, wherein forming the inner assembly further comprises bonding the layers of the filter material around the adsorbent to encapsulate the adsorbent.

16. The method of claim 13, wherein forming the inner assembly further comprises bonding the adsorbent to the filter material.

17. The method of claim 13, wherein the inner assembly and the containment assembly mutually define an interference fit.

* * * * *